(12) United States Patent
Dvorak

(10) Patent No.: US 8,215,435 B2
(45) Date of Patent: Jul. 10, 2012

(54) ADHESION AND BRAKING SYSTEM FOR A MAGNETIC SHIPPING CONTAINER CRAWLING APPARATUS

(76) Inventor: Edward Leroy Dvorak, Lakebay, WA (US)

( * ) Notice: Subject to any disclaimer, the term of this patent is extended or adjusted under 35 U.S.C. 154(b) by 366 days.

(21) Appl. No.: 12/583,974

(22) Filed: Aug. 27, 2009

(65) Prior Publication Data

US 2011/0050374 A1    Mar. 3, 2011

(51) Int. Cl.
*B60B 39/00* (2006.01)
(52) U.S. Cl. .......................................... 180/164; 180/7.1
(58) Field of Classification Search ................... 180/164
See application file for complete search history.

(56) References Cited

U.S. PATENT DOCUMENTS

| | | | | |
|---|---|---|---|---|
| 5,363,935 A | * | 11/1994 | Schempf et al. | 180/9.1 |
| 6,025,664 A | * | 2/2000 | Kuwahara | 310/77 |
| 6,125,995 A | * | 10/2000 | Layne et al. | 198/842 |
| 7,872,850 B2 | * | 1/2011 | Pelrine et al. | 361/234 |
| 2002/0104693 A1 | * | 8/2002 | Moore et al. | 180/9.1 |
| 2008/0211341 A1 | * | 9/2008 | Pelrine et al. | 310/309 |
| 2009/0166102 A1 | * | 7/2009 | Waibel et al. | 180/7.1 |
| 2010/0218624 A1 | * | 9/2010 | Atwood et al. | 73/865.8 |

* cited by examiner

*Primary Examiner* — Tony Winner
(74) *Attorney, Agent, or Firm* — Mark S. Hubert

(57) ABSTRACT

A magnetic adhesive and braking system for a remote controlled vehicle adapted for traversing across ferromagnetic surfaces of a steel shipping container including the vertical walls and ceiling. The magnetic wheel system allows the vehicle to traverse vertical grades. The magnetic braking system both securely holds the vehicle when stopped on a vertical surface, and exerts enough attractive force between the vehicle and the shipping container to allow a vehicle mounted drill to operate. The magnetic brake design uses mechanical advantage such that the force required to roll the vehicle vertically downward is heightened to the force required to detach the vehicle in a perpendicular vector from the container's surface.

20 Claims, 12 Drawing Sheets

ADHESION AND BRAKING SYSTEM FOR A MAGNETIC SHIPPING CONTAINER CRAWLING APPARATUS

BACKGROUND OF THE INVENTION

The present invention relates to a remote controlled vehicle adapted for traversing across the surfaces of a steel shipping container. It is capable of carrying a plethora of investigative equipment such as sniffers, cameras, fibre optics, drills and the such.

Even with homeland security measures heightened the majority of shipping containers reaching American international ports go uninspected. The volume of cargo containers is beyond what the authorities can handle. It is a time consuming task and often dangerous when the contents of a shipping container have shifted and opened. While leaking contents may be visible most chemical spills remain of an unknown nature. Remote controlled vehicles have been extensively used in scientific and police work where it is impractical, impossible or too hazardous to send a person.

Henceforth, a remote controlled reconnaissance vehicle for use on a steel shipping container would fulfill a long felt need in the inspection industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a remote controlled vehicle with magnetic wheels and a magnetic braking system to affix the vehicle to a steel surface strong enough so as to enable a drill on the vehicle to exert enough force between the vehicle and the steel surface to pierce the steel surface.

It has many of the advantages mentioned heretofore and many novel features that result in a new remote controlled reconnaissance vehicle with the ability for vertical and inverted overhead travel on these steel containers and with the capability for sampling the atmosphere or viewing the container contents from any vantage point of the container which is not anticipated, rendered obvious, suggested, or even implied by any of the prior art, either alone or in any combination thereof.

In accordance with the invention, an object of the present invention is to provide a remote controlled vehicle for traversing all orientations of metal surfaces.

It is a further objective of the present invention to provide a remote controlled vehicle for traversing all orientations of metal surfaces having magnetic wheels.

It is another objective of the present invention to provide a remote controlled vehicle for traversing all orientations of metal surfaces and capable of carrying reconnaissance equipment.

It is still another objective of the present invention to provide a remote controlled vehicle for traversing all orientations of metal surfaces and capable of utilizing a magnetic brake and magnetic wheels to secure the vehicle for drilling operations from the vehicle.

It is a final objective of the present invention to provide a remote controlled vehicle for traversing all orientations of metal surfaces, having a magnetic brake to prevent rollback of the vehicle when stopped on a vertical surface.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
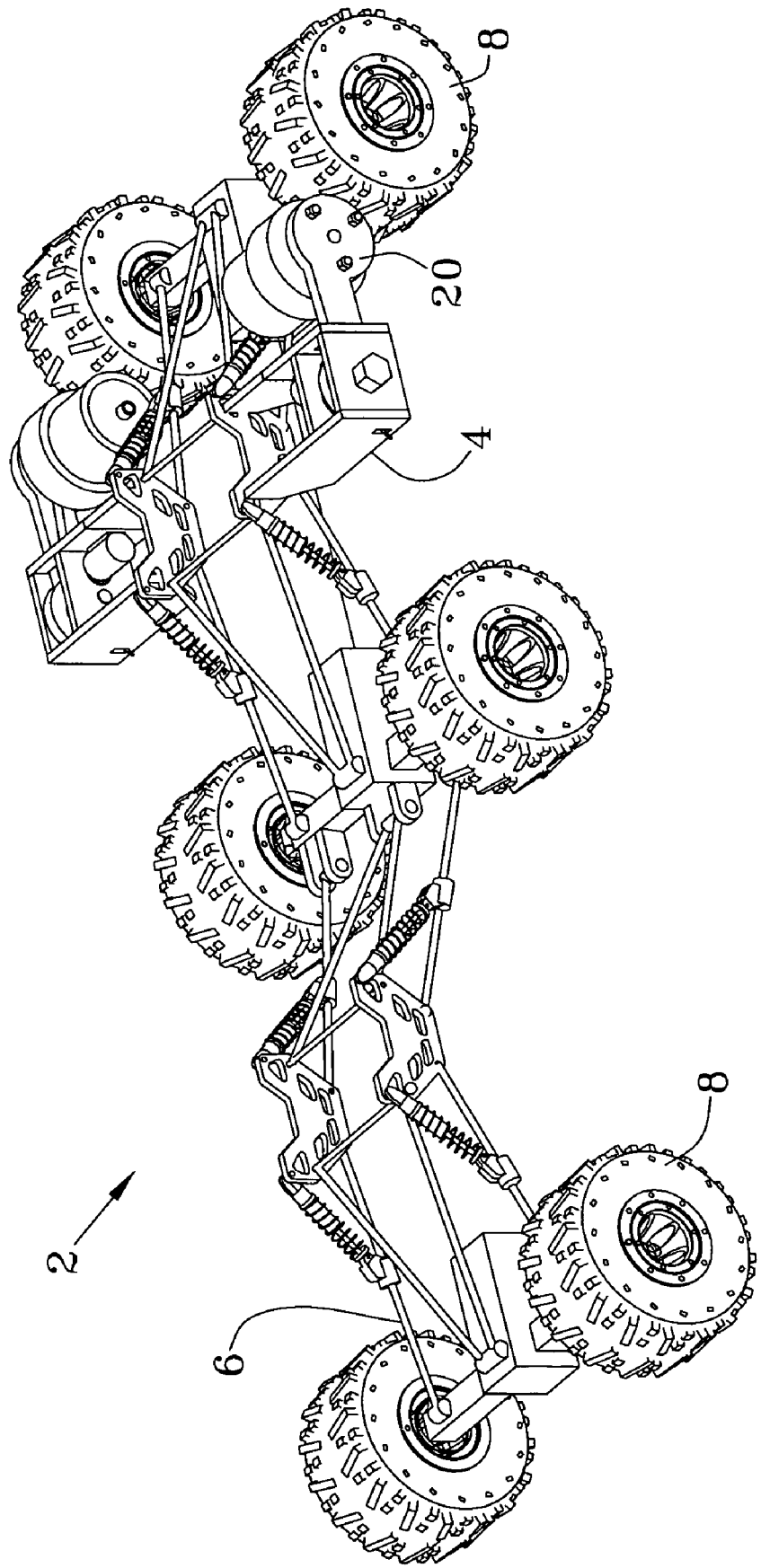
FIG. 1 is a perspective view of the preferred embodiment six wheeled mag vehicle showing the general arrangement of all components.
Figure 2:
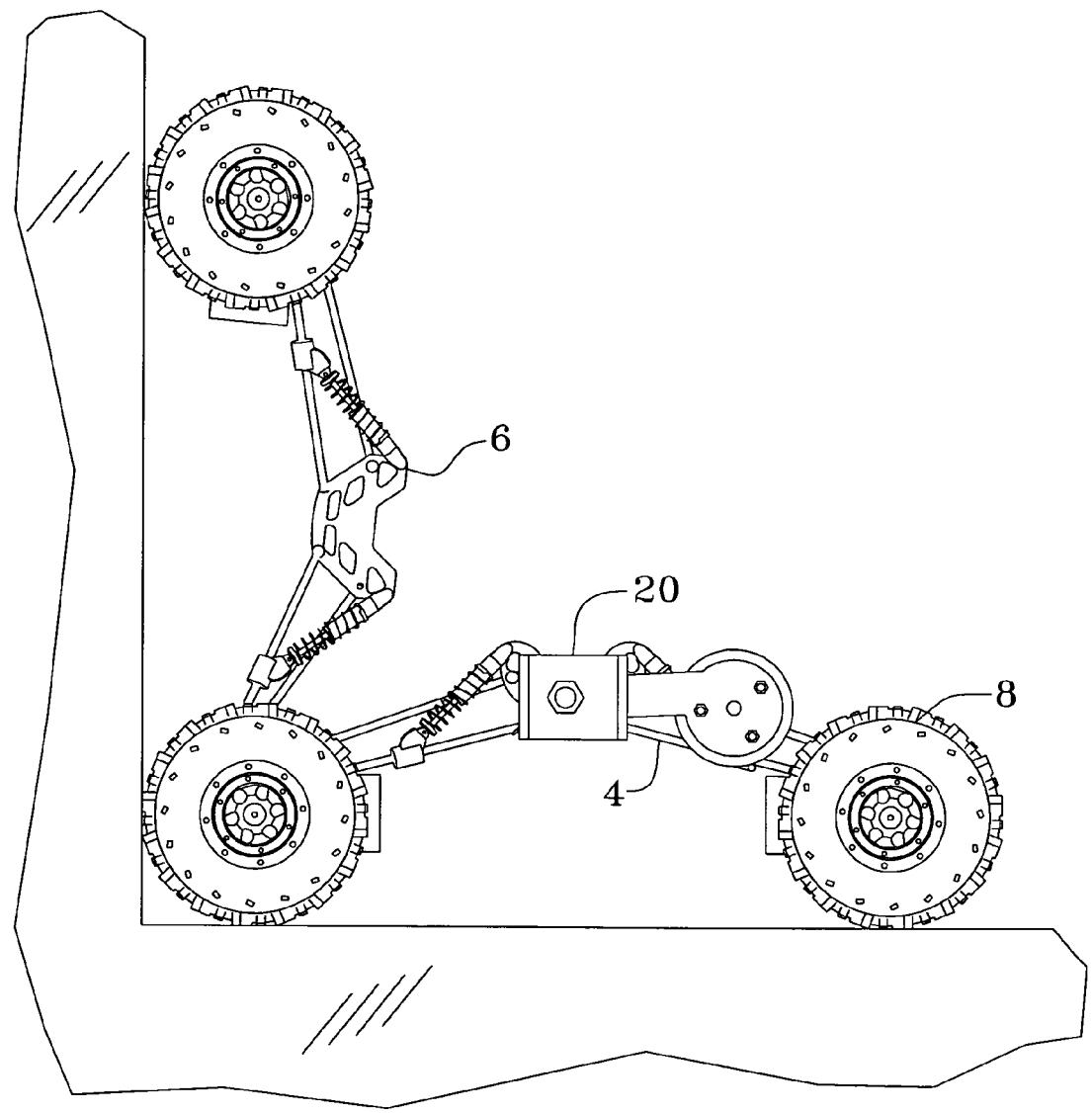
FIG. 2 is a side view of the preferred embodiment six wheeled mag vehicle showing an articulation of the trailer when climbing up a vertical wall.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

Figure 3:
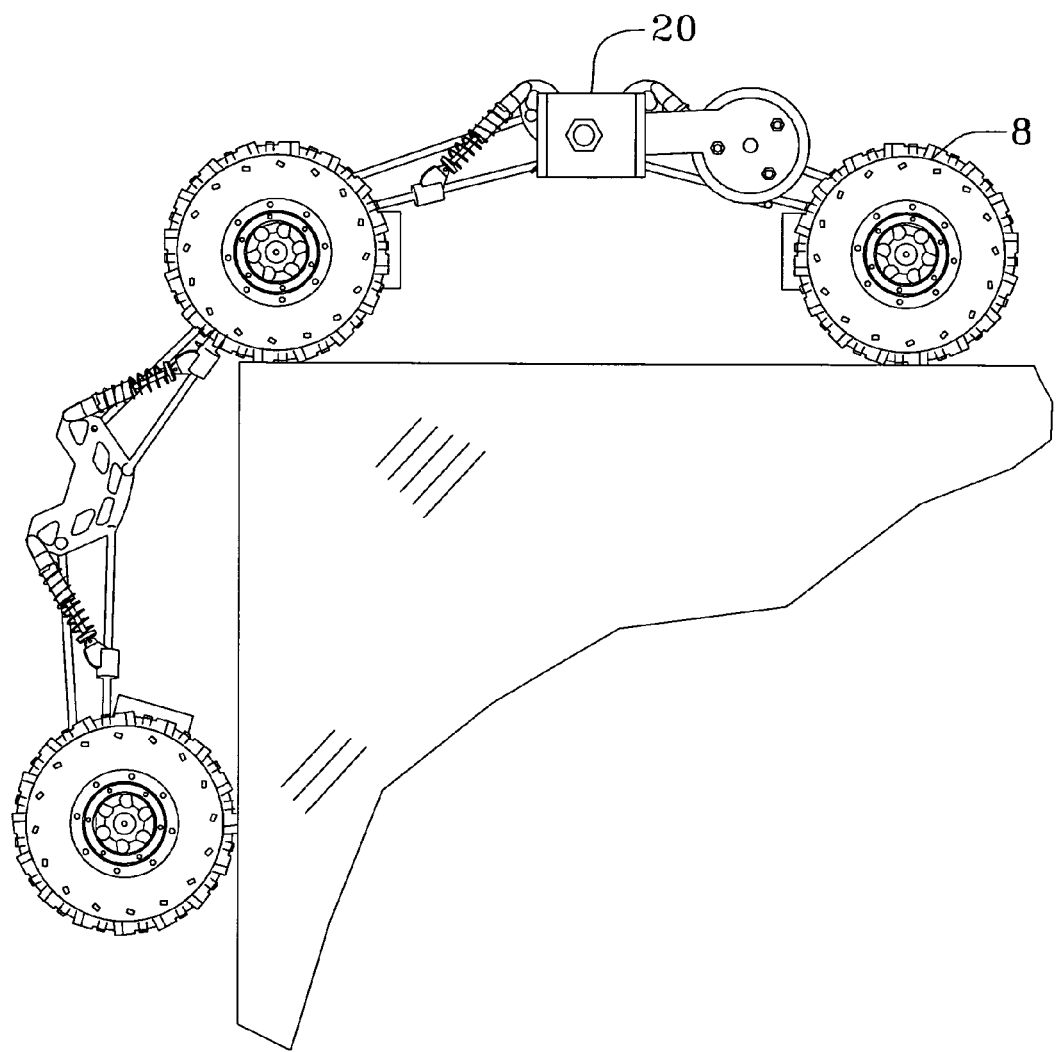
FIG. 3 is a side view of the preferred embodiment six wheeled mag vehicle showing an articulation of the trailer when climbing down a vertical wall.
Figure 4:
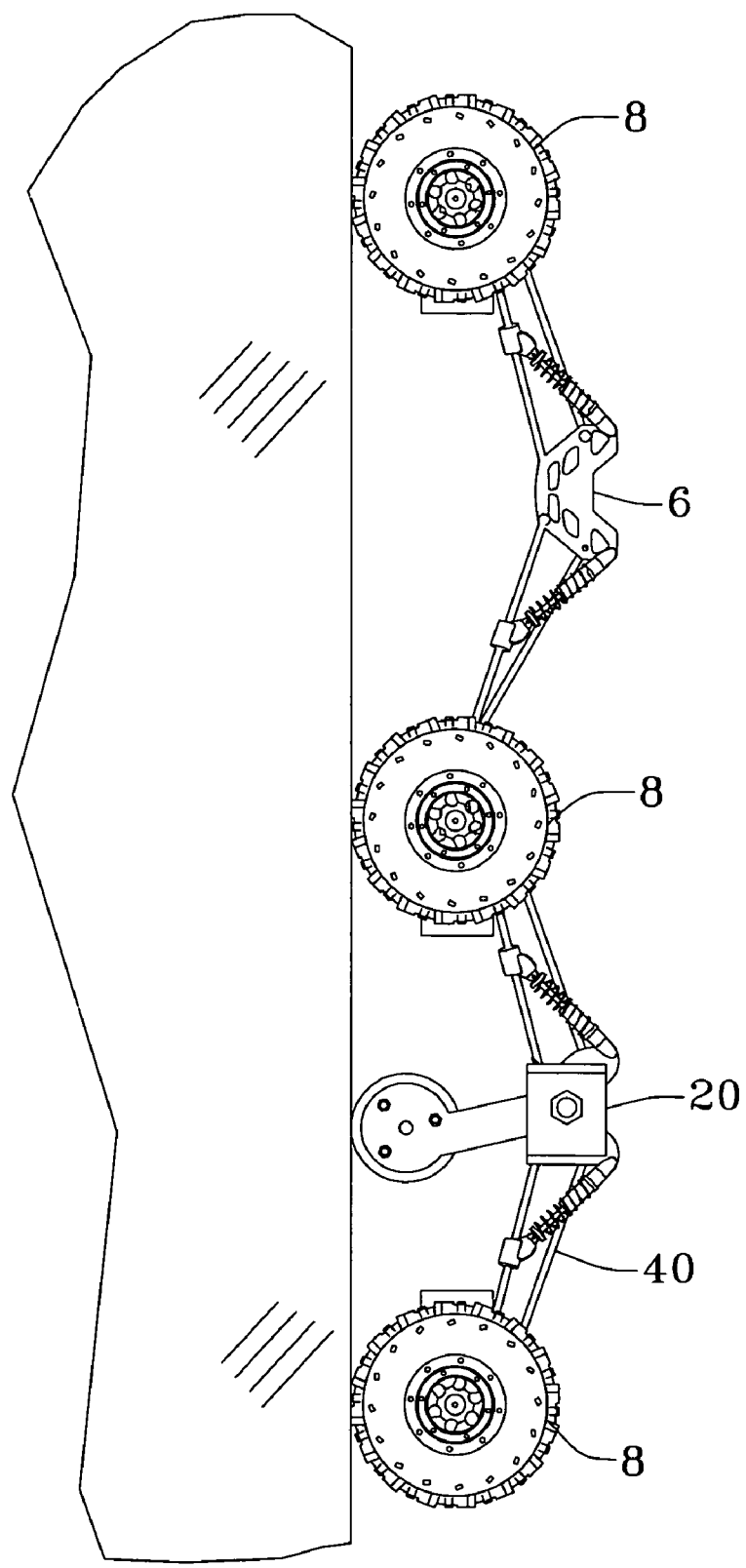
FIG. 4 is a side view of the preferred embodiment six wheeled mag vehicle showing the vehicle on a vertical wall with the magnetic brake engaged.

Looking at FIGS. 1 to 4 a six wheel version of a magnetic shipping container crawling apparatus 2 can best be seen. A four wheel magnetic shipping container apparatus 4 is best illustrated in FIGS. 5 to 8. These two versions differ only by the addition of a two wheeled tractor 6 that is pivotally mounted to the four wheel version 4 which becomes a trailer. The two wheeled tractor 6 and the four wheel trailer 4 are connected by a length of adjoined chain links with a biaxial pivot at one end that allows horizontal and vertical articulation simultaneously to accommodate travel over any surface. This type of connection is well known in the art and is not illustrated. This accommodates the transition between horizontal and vertical surfaces (FIG. 2) and vertical and horizontal surfaces (FIG. 3).

The preferential size of each vehicle is 1/8 scale although other sizes such as 1/6 and 1/10 scale have been utilized for specific operations. The frame is connected to the magnetic wheel assemblies 8 by a set of spring and strut limiters to allow ease of multi plane articulation. The vehicle has a battery powered RF signal receiver adapted for use with a battery powered RF signal transmitter operated by the user from a remote location that serves to actuate the drive system. The magnetic braking system 20 and any reconnaissance equipment is well known in the industry. The wheel assemblies 8 of all magnetic vehicles 4 are all driven and all steer. The magnetic wheel assemblies 8 of the tractor 6 are identical in all respects to the magnetic wheel assemblies 8 of the four wheel magnetic vehicle 4 and their frames are substantially similar in design.

Figure 9:
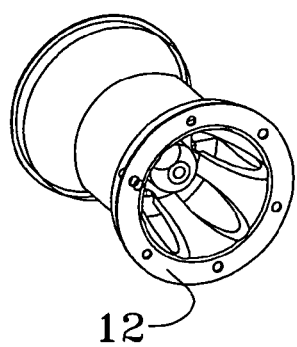
FIG. 9 is a perspective view of a wheel rim.
Figure 11:
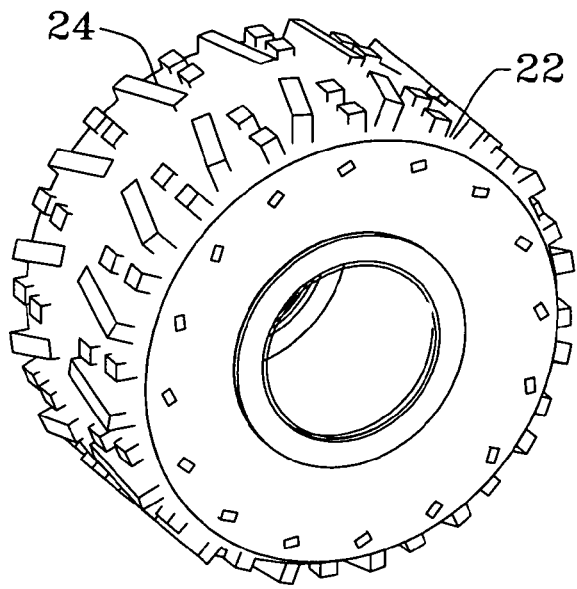
FIG. 11 is a perspective view of a tire.
Figure 10:
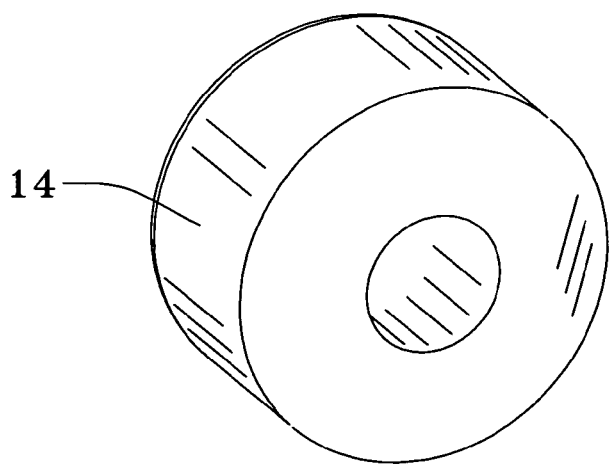
FIG. 10 is a perspective view of a foam insert.
Figure 12:
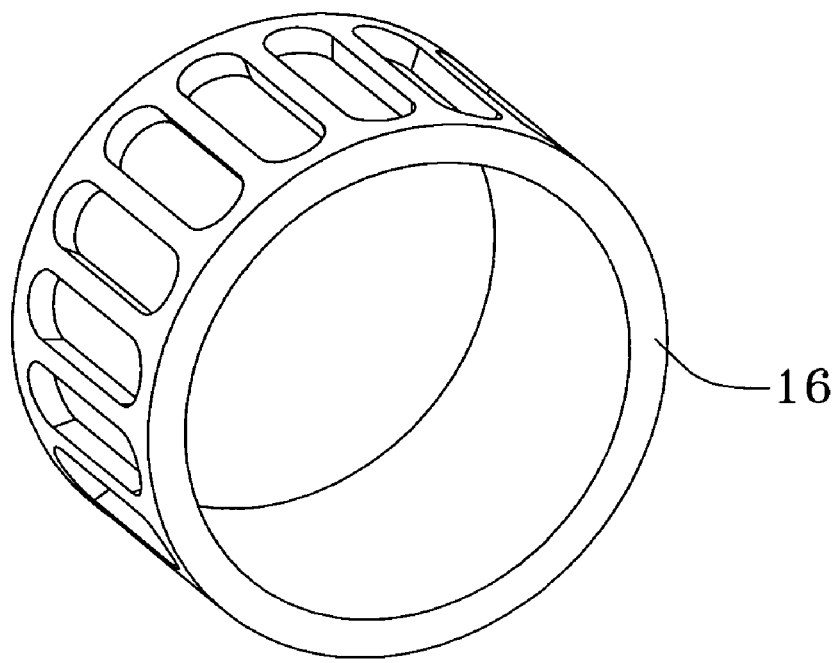
FIG. 12 is a perspective view of a magnetic retention ring with the magnets removed.
Figure 13:
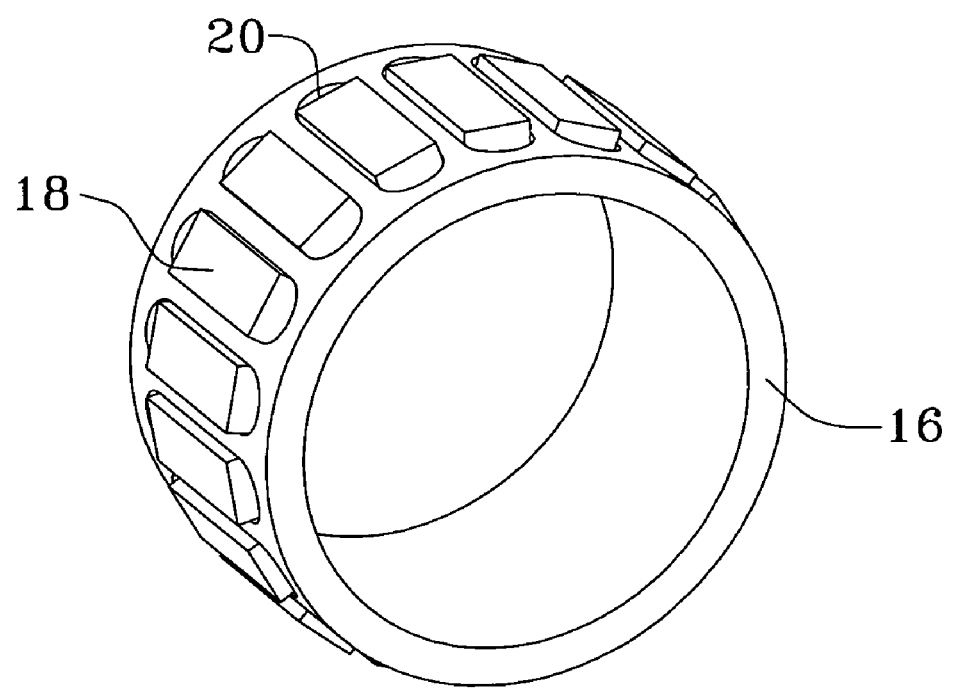
FIG. 13 is a perspective view of a magnetic retention ring with the magnets installed.

It is to be noted that none of the illustrations reflect the reconnaissance equipment that the vehicles are designed to carry, the drive system, the batteries and the remote control receiver and transmitter. These are not within the scope of the claimed invention and are well known in the art. For ease of illustration these have been eliminated from the drawings. While the remote operation means and the drive system of the vehicles remain essentially off the shelf, it is the wheel design that allows the vehicles to traverse in any orientation along ferromagnetic surfaces. The magnetic wheel assembly 8 has a solid wheel rim 12 (FIG. 9) upon which a foam ring 14 (FIG. 10) is mounted. The wheel rim 12 is journaled for rotation about a shaft or axle coupled to the vehicle's frame and drive system. The foam ring 14 resides between the wheel rim 12 and the magnetic retention ring 16 (FIG. 12) and lends support to the magnet retention ring 16 which houses a uniform series of identical permanent magnets 18 (FIG. 13) arranged about the retention ring's exterior periphery. A flexible, soft tire 22 (FIG. 11) that is frictionally affixed to the wheel rim 12 and encases the foam ring 14, the magnet retention ring 16 with permanent magnets of the rare earth variety 18, completes the wheel assembly 8. The tire 22 and magnet retention ring 16 are each formed as unitary pieces from a suitable elastomeric material.

The magnets 18 reside at approximate 20 degree intervals about the magnet retention ring 16 being held there in matingly conformed magnet recesses 20 by friction and by a flexible cement. Opposing poles are placed adjacent to each other. In the preferred embodiment the magnets each are capable of a 50 pound attraction based on a force exerted perpendicular to the ferromagnetic surface. The force required to turn the wheels is much less as the magnetic forces are incrementally removed while the wheels turn. Although there is a plethora of suitable glues an epoxy system of a silica epoxy resin with a polyamide resin hardener has been shown to work well.

The outer half of the magnet 18 is exposed to allow friction with the inside of the tire 22. The magnetic wheel assembly 8 is not pressurized. When assembled the portion of the soft tire 22 that lies between the ferromagnetic surface being traversed and the magnet retention ring 16 deforms under the weight of the vehicle and the magnetic affinity of the magnet laden ring 16 so as to minimize the distance between the magnets 18 and the surface, thereby maximizing the adhesive holding forces of the vehicle. In this manner a magnetic contact is maintained while the wheel assemblies 8 roll along the ferromagnetic surface.

The exterior surface of the tires 22 have a tread formation 24 to maximize traction on painted ferromagmetic surfaces, although the exterior surface could be modified for increased traction on wet or oily surfaces by the application of solvents, traction rings/chains or a different tread formation.

The disposition of the magnets 18 at approximate 20 degree intervals about the magnet retention ring 16 has shown to be an optimal spacing configuration when driving over a corrugated shipping container as more of the magnets 18 are exerting a strong magnetic field toward the ferromagnetic surface when the wheel is residing in the bottom trough of a corrugation. (Conventional corrugation of a shipping container has 3 inch wide parallel crests and troughs 1.5 inches apart with 45 degree sloped connecting walls.) It is known that smaller or larger magnets may be used with different spacing for different sized wheels and for different purposes. Generally on a flat ferromagnetic surface there is a minimum of one magnet 18 per wheel assembly in strong magnetic contact with the surface. With the 20 degree magnet spacing on a 1/8 scale wheel assembly when traversing a corrugated trough there is a minimum of six magnets 18 per wheel assembly in strong magnetic contact with the surface. It is to be noted that 10 degree interval spacing has been used with larger diameter wheels or smaller magnets. The wheel assemblies 8 are pivotally connected to a remotely controlled steering mechanism as is well known in the art and is not illustrated herein.

In operation, as the tire 22 flexes and compresses at the contact plane between the wheel assembly 8 and the ferromagnetic surface, the magnet retention ring 16 is allowed to come into close enough contact with the surface to effect a strong gripping force. During rolling contact a strong magnetic attraction is maintained orthogonally between the magnetic wheel assemblies 8 and the ferromagnetic surface. A multi wheeled shipping container crawling apparatus in the referenced scale sizes with the above wheel assembly configuration is able to ascend and descend vertical walls as well as traverse inverted on horizontal surfaces and make the transition from horizontal to vertical travel and vice versa.

Each of the 18 magnets 18 in the magnet retention ring 16 has approximately two and a half times the holding strength of the total weight of a six wheeled vehicle (with the weight of all wheels included) when on a flat ferromagnetic surface. I.E. for a 1/8 scale vehicle with a weight of 20 pounds, each of the magnets in the magnet ring can lift 50 pounds vertically in air. Since a minimum of two magnets are always in magnetic contact with the surface because of the deformation of the tires 22, with six wheels on a flat surface the holding power of the vehicle is 600 pounds. On a corrugated surface this holding power may increase by as much as three times up to 1800 lbs depending upon the actual location of each wheel. For this reason when traversing corrugated steel shipping containers there is no need for the use of the magnetic brake system 20. Testing has shown that the drive system requires a motor to drive train gearing of 1:70 to 1:90 through a set of worm or pinion and spur gears to develop the extra torque required when traversing a corrugated shipping container wherein there is approximately 3 times the holding force generated by each wheel.

The magnetic braking system 20 retractably pivots a brake magnet 64 housed in a cylindrical brake magnet inner housing 60, downward from the approximate center of a magnetic shipping container crawling apparatus 2 into close proximity to the ferromagnetic surface that the crawling apparatus is traversing. The brake magnet inner housing 60 is positioned on the end of a brake arm 46 dimensioned so that its longitudinal axis forms an upwardly inclined acute angle with the ferromagnetic surface when the magnetic brake is engaged. In this configuration an integrated vehicle braking system is engaged. (FIG. 4) First, the additional magnetic attraction between the brake magnet 64 and the ferromagnetic surface acts to hold the vehicle in place. Second, the acute angle design transfers the downward vertical gravitational pull on the vehicle to a horizontal pull between all of the wheel assemblies 8 sand the ferromagnetic surface. When the vehicle resides on a horizontal surface, pulling the vehicle perpendicularly off of that ferromagnetic surface requires much more force than rolling the vehicle downward as would be the case if the acute angle formed between the brake arm 46 and the surface were downwardly inclined. In the preferred embodiment the brake magnets 64 each have 170 pounds of attractive force. Thus with two magnetic brakes applied there will be 340 pounds of magnetic attraction to hold the 20 pound vehicle in place and when drilling, another 600 pounds is available from each of the magnetic wheel assemblies 20. This additional 600 pounds being applied by virtue of the brake arm's acute upward angle.

Figure 16:
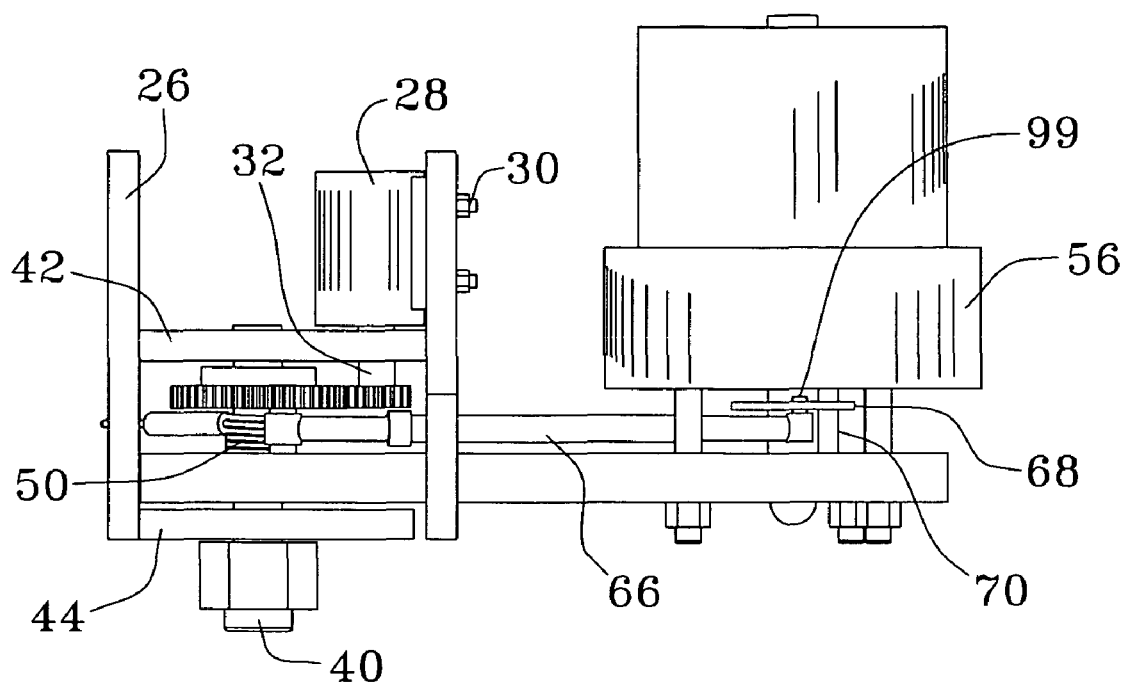
FIG. 16 is a top view of the magnetic brake in the disengaged position.
Figure 17:
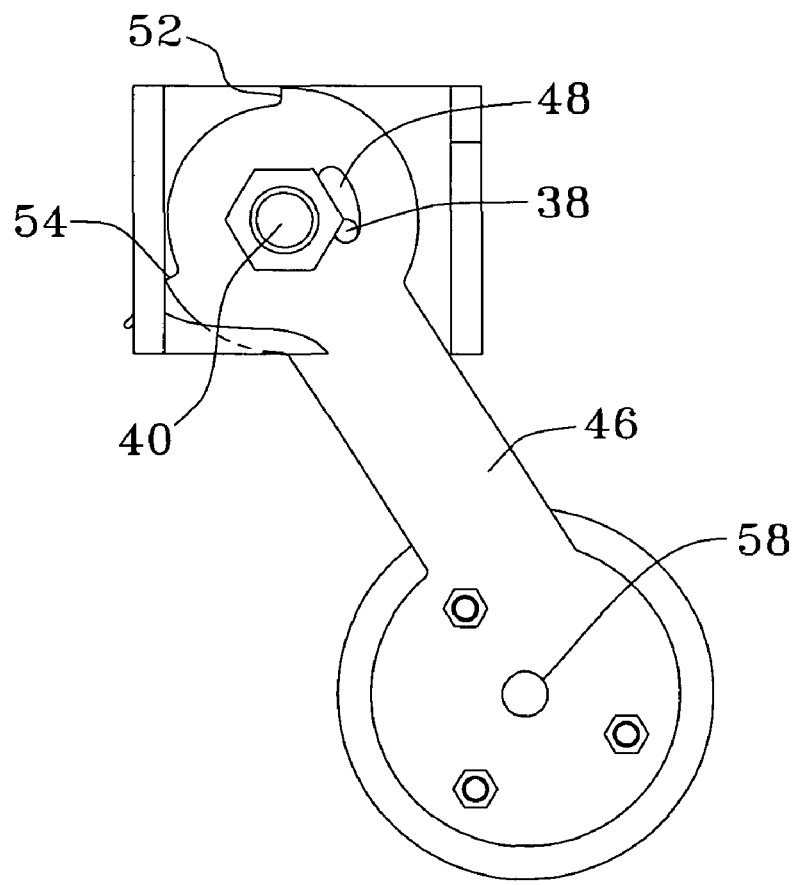
FIG. 17 is a side view of the magnetic brake in the engaged position.
Figure 18:
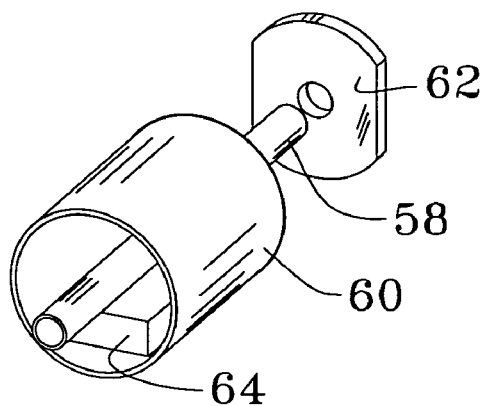
FIG. 18 is a perspective view of the magnetic brake's magnet barrel.
Figure 19:
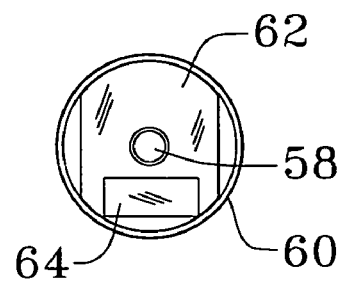
FIG. 19 is a side cross sectional view of the magnetic brake's magnet barrel.
Figure 20:
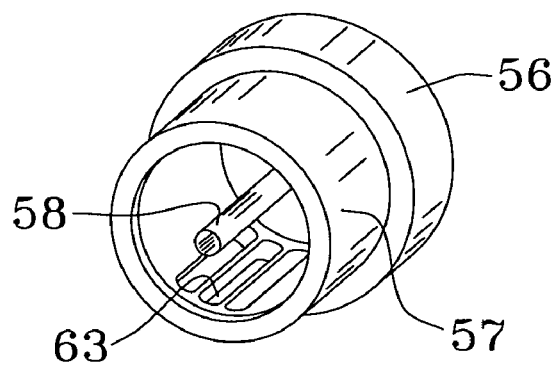
FIG. 20 is a perspective view of the brake housing without the magnet barrel installed.

The magnetic braking system 20 has a housing 26 (FIG. 14) that mechanically supports remote controlled motor 28 through mechanical fasteners 30. The motor's drive shaft 32 has a small drive gear 34 (FIG. 21) thereon that meshingly engages a larger driven gear 36 having a drive peg 38 extending normally therefrom. The drive peg 38 extents through an arced slot 48 in brake arm 46. (FIG. 17) The driven gear 36 and brake arm 46 are pivotally supported on stub axle 40 which is held in position by an inner parallel plate 42 and an outer parallel plate 44 of the housing 26 (FIG. 16) and mechanically affixed to the plates at its distal and proximate ends. A spring means 50 is attached to the stub axle 40 so as to present a counterclockwise torsional force on the stub axle 40. (FIG. 22) Although the spring means 50 is illustrated as a torsional spring, a retraction coil spring could also be connected to accomplish the same result. At the inner end of the brake arm 46 is an upper stop protrusion 52 and a lower stop protrusion 54 that limit the rotation of the brake arm 46 by abutting the side of the housing 26. (FIG. 17) The outer end of the brake arm 46 is mechanically connected to the brake magnet outer housing 56 and has a central bore formed therein that supports pivot shaft 58 which is connected to brake magnet inner housing 60 by plate 62. (FIG. 18) The brake magnet inner housing 60 is a hollow cylinder rotatably housed within cylindrical brake magnet outer housing 56. The brake magnet inner housing 60 has a section of removed housing material 63 (magnet recess) in which the brake magnet 64 resides and is affixed. (FIGS. 18, 19 and 20) A end cap not illustrated encloses the brake magnet inner housing 60 to protect it from harsh elements. A thrust shaft 66 is connected at its ends between drive peg 38 and rotate disc 68 which is affixed to plate 62 via pivot shaft 58. (FIGS. 16 and 22) The rotate disc 68 is coupled to the thrust shaft by an off centered pin 99 so as to translate the linear motion of the thrust shaft 66 into rotational motion of the brake magnet inner housing 60. Each end of the thrust shaft is adapted for rotatable engagement.

Figure 5:
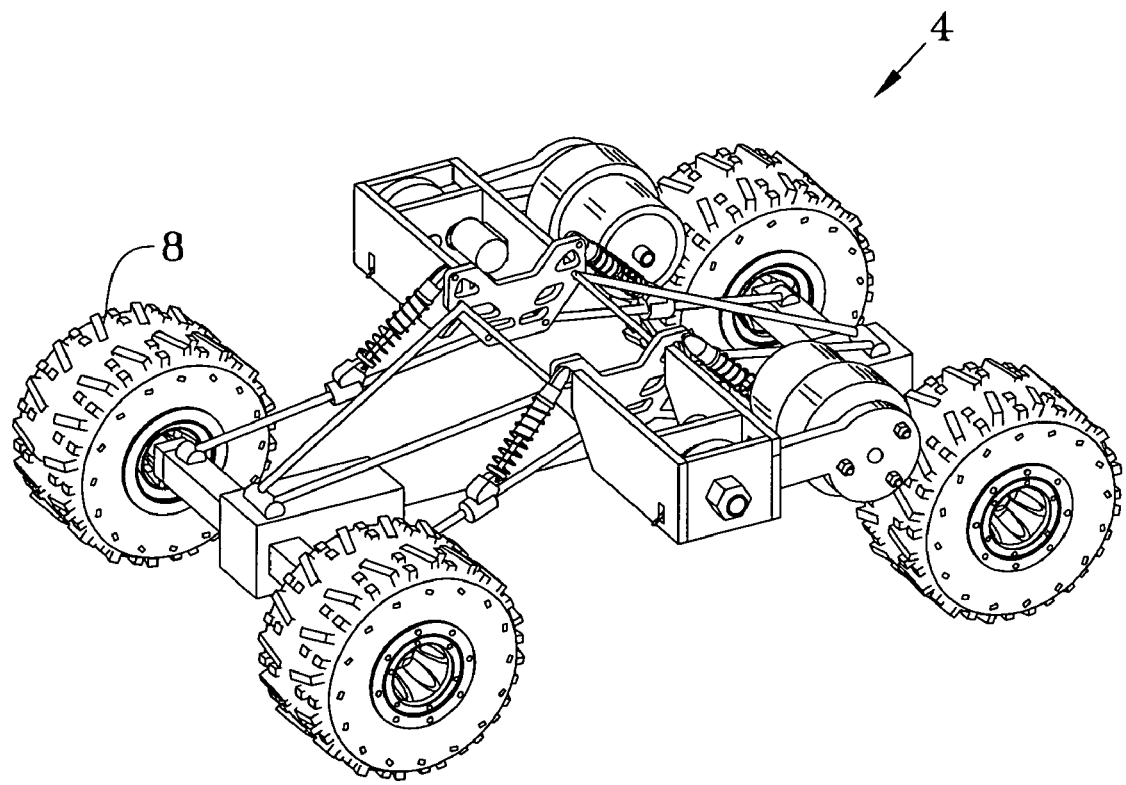
FIG. 5 is a perspective view of the alternate embodiment four wheeled mag vehicle showing the general arrangement of all components.
Figure 6:
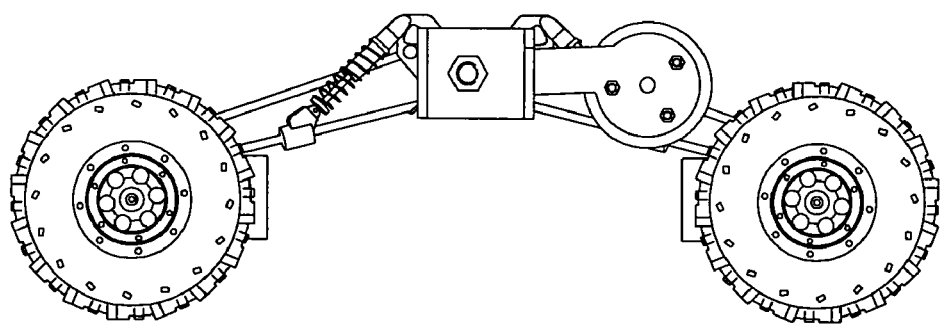
FIG. 6 is a side view of the alternate embodiment four wheeled mag vehicle with the magnetic brake disengaged.
Figure 7:
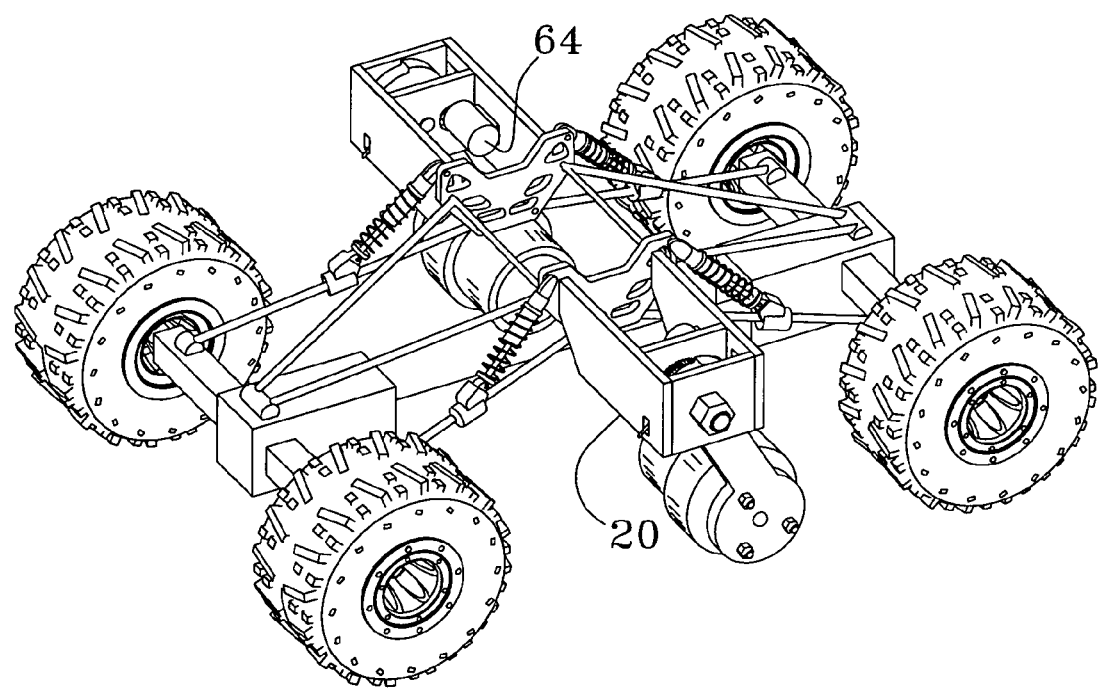
FIG. 7 is a perspective view of the alternate embodiment four wheeled mag vehicle with the magnetic brake engaged.
Figure 8:
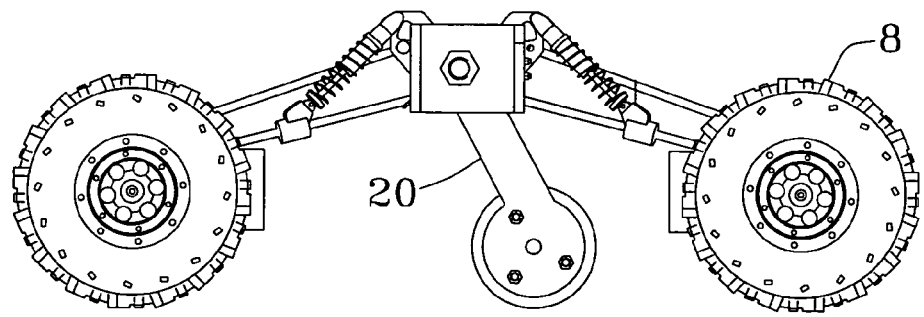
FIG. 8 is a side view of the alternate embodiment four wheeled mag vehicle with the magnetic brake engaged.

In the preferred embodiment there is actually two independent, identical mirror image magnetic braking systems 20 utilized on opposite sides of the vehicle as illustrated best in FIGS. 1 and 5. The magnetic strength of each of the brakes is 170 pounds. This is not necessary in all situations but rather is dictated by the amount of downward force exerted off of the vehicle's platform, such as would be encountered through a vehicle mounted drilling device for boring holes in the surface traversed.

Figure 14:
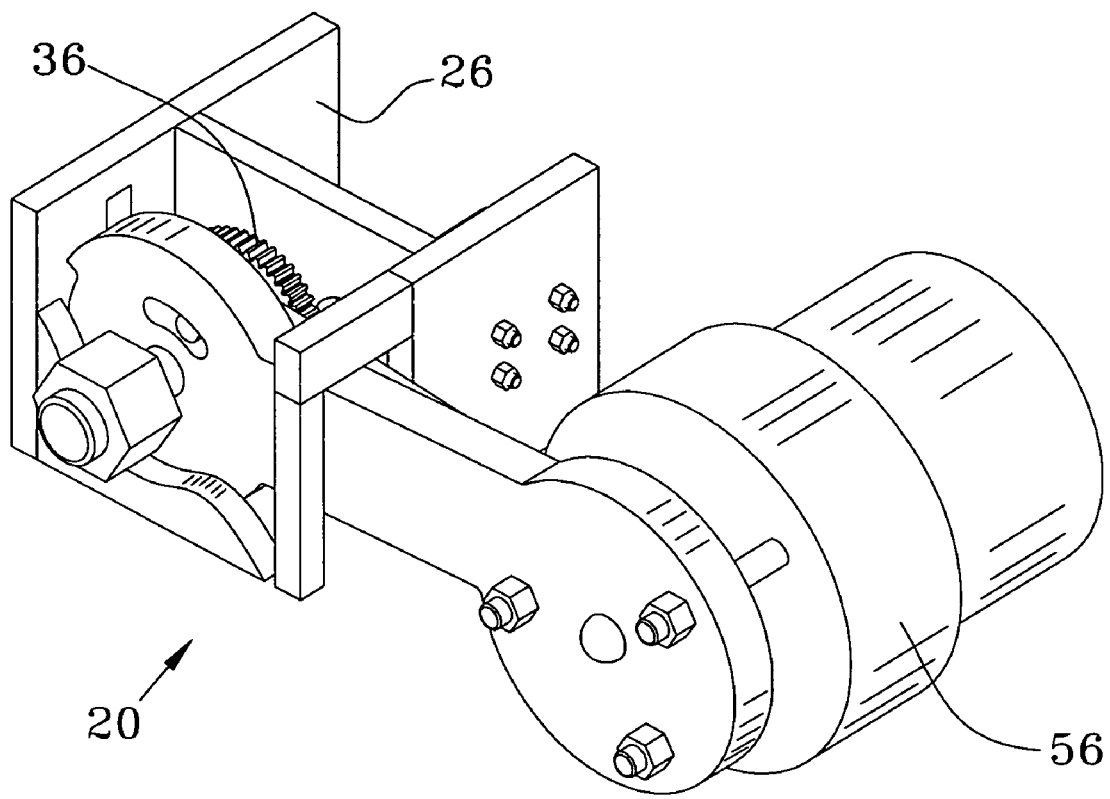
FIG. 14 is a perspective view of the magnetic brake in the disengaged position.
Figure 15:
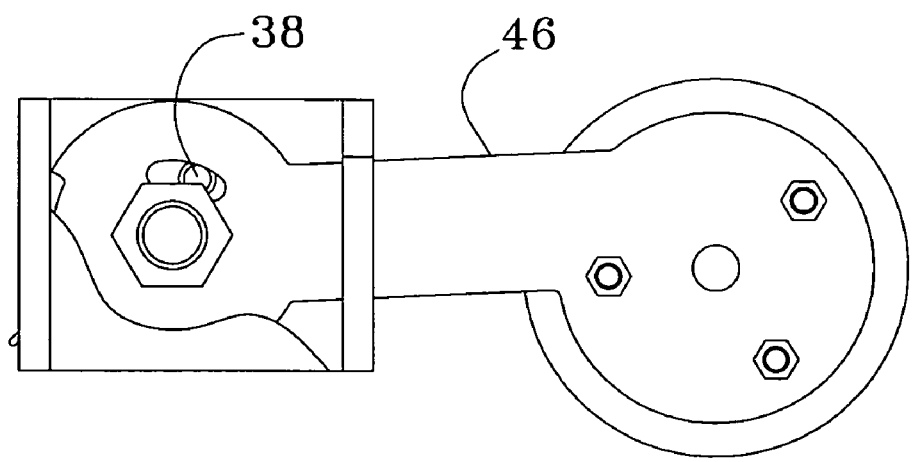
FIG. 15 is a side view of the magnetic brake in the disengaged position.
Figure 21:
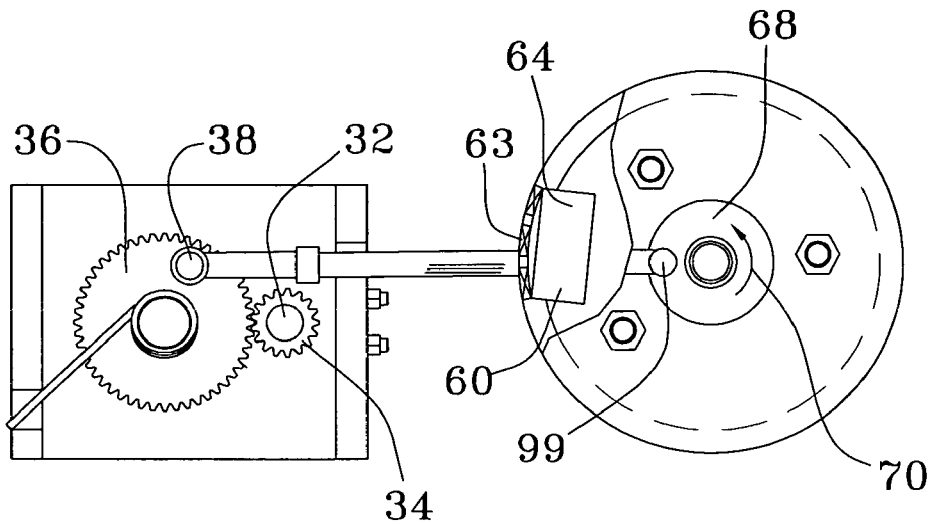
FIG. 21 is a side view of the magnetic brake in the disengaged position.
Figure 22:
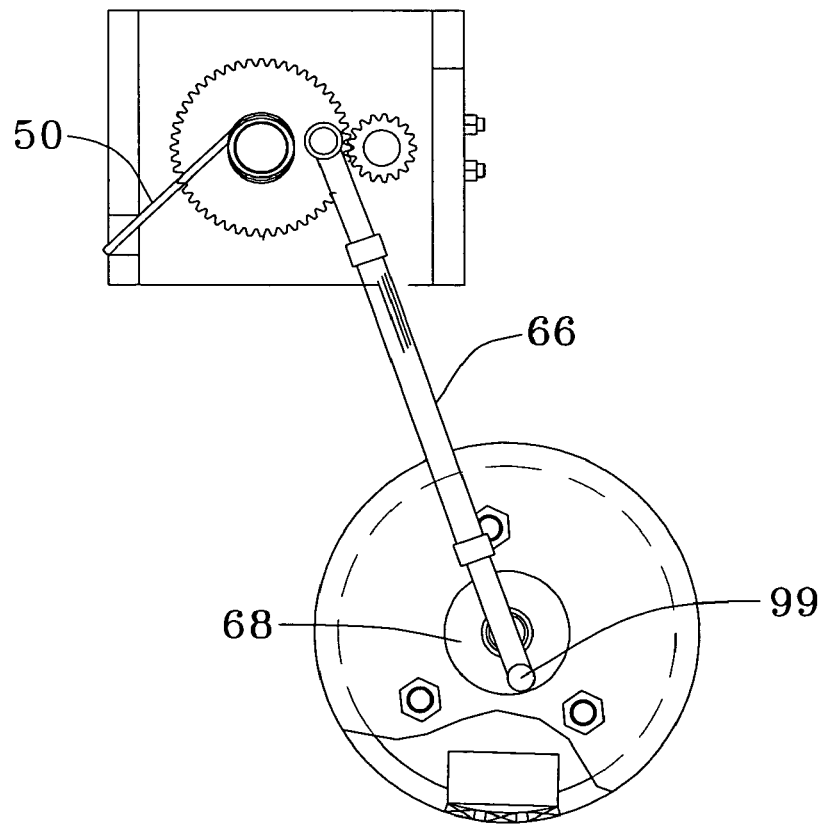
FIG. 22 is a side view of the magnetic brake in the engaged position.

Looking at FIGS. 14, 15, 17, 21 and 22 it can be seen how the magnetic brake system 20 works. When not actuated there is no remote drive signal sent to the remote controlled DC powered motor 28 and no rotational torque is generated by the motor 28 to overcome the torsion spring means 50 which applies a counterclockwise torque on the stub axle 40 so as to rotate the brake arm 46 counterclockwise until the upper stop protrusion 52 contacts the side plate of the housing 26 at the same time as the upper end of the actuation shaft 66 is pivoted until the drive peg 38 contacts the upper side of the arced slot 48 and the lower end of the thrust shaft 66 rotates the plate 62 so as to position the brake magnet 64 and brake arm 46 as illustrated in FIGS. 14, 15 and 21. Here the brake magnet 64 is too far from the ferromagnetic surface to have any holding effect and to prevent the brake magnet 64 from attraction to the magnets 18 in the wheel assembly 8.

Operation of the magnetic brake system for engagement or disengagement is a two step process. First the brake magnet 64 must be rotated and then the brake magnet 64 must be lowered or raised. In order to engage the magnetic brake system 20 a remote signal from a remote sending unit is sent to the remote controlled motor 28 from which begins to rotate its drive shaft 32 and attached small drive gear 34 counterclockwise. This in turn rotates larger driven gear 36 clockwise overcoming the counterclockwise force of the spring means 50. As the drive peg 38 on the larger driven gear 36 rotates clockwise it travels along the arced slot 48 in the brake arm 46 (FIG. 15) and forces the thrust shaft 66 to extend slightly outward from the magnetic brake housing 26 to turn rotate disc 68 which is affixed onto pivot shaft 58 and rotates plate 62 in the direction indicated by directional arrow 70. Since plate 62 is also affixed to the pivot shaft 58 and is housed in the end of the brake magnet inner housing 60 the inner housing 60 rotates counterclockwise within the brake magnet outer housing 56 so as to move the position of the magnet 64 out of its 9 o'clock position toward the ferromagnetic surface between 90 and 120 degrees to the approximately 5:30 position. This is accomplished when the drive peg 38 contacts the end of the arced slot 48 in the brake arm 46. Once the drive peg 38 contacts the end of the arced slot 48 the motor 28 continues to exert torque and push the thrust shaft 66 further outward which forces the drive peg 38 to rotate the brake arm 46 clockwise which lowers the other end of the brake arm 46 and the brake magnet 64 into contact with the ferromagnetic surface. With the brake magnet 64 in close proximity to the ferromagnetic surface the remote controlled motor 28 can be shut off.

It is to be noted that an acute forward (upward if on a vertical surface) angle will always reside between the brake arm 46 and the ferromagnetic surface as the brake arm 46 can only rotate until the lower stop protrusion 54 contacts the side plate of the magnetic brake housing 26. It is to be noted that depending where the vehicle's wheel assemblies 8 are physically located on a corrugated container the stop protrusion may not be utilized.

While the brake magnet 64 is encased within the brake magnet inner housing 60 so as to be protected, it actually sits in the magnet recess 63 which leaves only a thin amount of the brake magnet inner housing cylinder wall between the ferromagnetic surface and the brake magnet 64. Experimentation has shown that a cylinder wall thickness of 0.010 inch is adequate to withstand the forces and support the brake magnet 64.

To disengage the magnetic brake 20 the process is reversed. The remote controlled motor 28 is remotely signaled to reverse its rotation and turn clockwise which first rotates the inner magnetic brake housing 60 approximately 90 to 120 degrees from the 5:30 o'clock position back to the 9 o'clock position to minimize the magnetic attraction between the brake magnet 64 and the ferromagnetic surface. Then when the drive peg 38 contacts the opposite end of the arced slot 48 the motor continues to drive the brake arm 46 to its original position. Once there the motor is shut off and the brake arm 46 is held in position by spring means 50.

This sequencing is necessary to be able to use lightweight, inexpensive and conventional components. A lightweight DC powered motor 28 although highly geared for maximum torque could not directly lift the brake arm 46 without some of the magnetic attraction removed. Increasing the motor size requires larger batteries and more mass which is very undesirable.

In the preferred embodiment, the brake arm 46 rotates over approximately 45 degrees by virtue of the arced slot 48. The brake magnet inner housing 60 rotates 90 degrees by virtue of the thrust arm travel.

In another embodiment not shown, the operation of the magnetic braking system 20 works theoretically similar however the rotate disc 68 is relocated 180 degrees such that the drive post 99 resides below pivot shaft 58. This configuration however, places the brake magnet 64 when retracted at the 3o'clock position which is closer to the magnetic wheels 8 and will cause more torque to be exerted to overcome the magnetic attraction between the brake magnet 64 and the wheel magnets 18, but under certain situations may offer mechanical operation advantages.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A magnetic system for allowing the movement and braking of a remote controlled, scale sized vehicle onto vertical ferromagnetic surfaces comprising:
    at least one magnetic wheel assembly; and
    at least one remote controlled magnetic brake assembly, wherein said magnetic wheel assembly is rotationally coupled to a frame and a drive system of said vehicle, and wherein said magnetic brake assembly is affixed to said vehicle frame and adapted to lower and rotate a brake magnet from below said vehicle to an adjacent ferromagnetic surface.

2. The magnetic system of claim 1 wherein said remote controlled magnetic brake assembly further comprises:
    a housing mechanically affixed to said vehicle;
    a remote controlled motor residing in said housing and coupled to a drive shaft with a drive gear affixed thereto;
    a driven gear enmeshed with said drive gear for rotational communication;
    a thrust arm having a distal and proximate end wherein said distal end is coupled to said driven gear;
    a brake arm rotationally connected at a first end to said driven gear and having a brake magnet outer housing affixed at a second end;
    a cylindrical walled inner brake magnet housing rotationally housed in said brake magnet outer housing and rotationally coupled to said proximate end of said thrust arm;
    a magnet residing within a recess in said cylindrical wall of said inner brake magnet housing;
    wherein rotation of said motor turns said enmeshed gears to sequentially move said thrust shaft to rotate said inner brake magnet housing inside said outer brake magnet housing and to rotate said brake arm away from said vehicle and toward said ferromagnetic surface.

3. The magnetic system of claim 2 wherein said remote controlled magnetic brake assembly further comprises a drive post extending normally from said driven gear that extends through an arced slot formed through said first end of said brake arm and which connects to said distal end of said thrust arm.

4. The magnetic system of claim 3 wherein said remote controlled magnetic brake assembly further comprises an upper travel stop limiter and a lower travel stop limiter formed as protrusions on said first end of said brake arm that contact said housing to limit the rotational travel of said brake arm.

5. The magnetic system of claim 4 wherein said remote controlled magnetic brake assembly is limited in its rotation away from said vehicle and toward said ferromagnetic surface such that the included angle between a linear axis of said brake arm and a linear axis of said vehicle is an acute angle.

6. The magnetic system of claim 5 wherein said remote controlled magnetic brake assembly further comprises a pivot shaft that connects to an end plate in said inner brake magnet housing and to a pivot plate coupled to said proximate end of the thrust arm by an off centered peg, so as to translate linear movement of said thrust shaft into rotational movement of said inner brake magnet housing.

7. The magnetic system of claim 6 wherein said arced slot formed through said first end of said brake arm allows said driven gear to rotate approximately 45 degrees freely before said drive post contacts a side of said arced slot.

8. The magnetic system of claim 7 wherein said lower travel stop limiter allows said brake arm to rotate only approximately 45 degrees after said drive post contacts a side of said arced slot.

9. The magnetic system of claim 1 wherein said remote controlled magnetic brake assembly comprises a remote controlled DC motor driven brake arm assembly that pivotally lowers a brake magnet housed in a rotating brake magnet assembly that rotates said magnet toward said ferromagnetic surface.

10. The magnetic system of claim 9 wherein said remote controlled magnetic brake assembly has a lower travel limiter on said brake arm assembly that prevents said brake arm assembly from lowering to a position where an included angle formed between a linear axis of said vehicle and a linear axis of said brake arm assembly is greater than acute.

11. The magnetic system of claim 1 wherein said magnetic wheel assembly comprises:
   at least one wheel;
   at least one magnetic retention ring;
   at least one magnet; and
   at least one flexible, resilient tire;
   wherein said magnetic retention ring houses a uniform series of identical permanent magnets arranged at a fixed angular distance about the retention ring's exterior surface, and wherein said tire is affixed about an inner periphery to said at least one wheel and houses said magnet retention ring therein, and wherein said wheel is journaled for rotation about a shaft or axle coupled to said vehicle's frame and drive system.

12. The magnetic system of claim 11 wherein said magnetic wheel assembly further comprises a foam ring positioned between said wheel and said magnet retention ring so as to lend support to said magnet retention ring.

13. The magnetic system of claim 12 wherein said fixed angular distance is approximately 20 degrees.

14. The magnetic system of claim 12 wherein said fixed angular distance is approximately 10 degrees.

15. The magnetic system of claim 13 wherein said magnetic retention ring has recesses formed on said exterior surface that are matingly conformed to frictionally constrain said magnets and further comprises a flexible adhesive that bonds said magnets in said recesses to said outer surface of said magnetic retention ring.

16. The magnetic system of claim 15 wherein said tire and said magnetic retention ring are formed from an elastomeric material.

17. The magnetic system of claim 1 wherein said magnetic wheel assembly comprises:
   at least one wheel;
   a magnetic retention ring;
   at least one magnet; and
   a flexible, resilient tire;
   wherein said magnetic retention ring houses a uniform series of identical permanent magnets arranged at a fixed angular distance about the retention ring's exterior surface, and wherein said tire is affixed about an inner periphery to said at least one wheel and houses said magnet retention ring therein, and wherein said wheel is journaled for rotation about a shaft or axle coupled to the vehicle's frame and drive system.

18. The magnetic system of claim 17 wherein said magnetic wheel assembly further comprises a foam ring positioned between said wheel and said magnet retention ring so as to lend support to said magnet retention ring.

19. The magnetic system of claim 18 wherein said fixed angular distance is approximately 20 degrees.

20. The magnetic system of claim 19 wherein said magnetic retention ring has recesses formed on said exterior surface that are matingly conformed to frictionally constrain said magnets and further comprises a flexible adhesive that bonds said magnets in said recesses to said outer surface of said magnetic retention ring.

* * * * *